United States Patent Office 3,535,364
Patented Oct. 20, 1970

3,535,364
PROCESS FOR PREPARING AROMATIC ISO-
THIOCYANATES FROM AROMATIC NITRO
COMPOUNDS
Peter H. Scott, Guilford, and Haywood Hooks, Jr., West
Haven, Conn., assignors to Olin Corporation, a corporation of Virginia
No Drawing. Filed Oct. 29, 1968, Ser. No. 771,603
Int. Cl. C07c 161/04
U.S. Cl. 260—454            13 Claims

ABSTRACT OF THE DISCLOSURE

A process for preparing aromatic isothiocyanates which comprises reacting an aromatic nitrogen-containing compound such as an aromatic nitro compound, an aromatic nitroso compound, an aromatic azo compound or an aromatic azoxy compound with carbon disulfide and/or carbonyl sulfide in the presence of potassium hydrosulfide.

This invention relates to an improved process for the preparation of aromatic isothiocyanates.

Esters of isothiocyanic acid have been previously prepared. They are useful agricultural chemicals since they have exhibited valuable utility as fungicides and herbicides. Many of these esters are useful nematocides and insecticides particularly as moth-proofing agents. Isothiocyanates have also been extensively employed as intermediates in the preparation of pesticidal and pharmaceutical compounds. For instance, they have been reacted with stoichiometric amounts of chlorine to provide N-aryl- and N-alkyl-S-chloroisothiocarbamoyl chlorides, for example, as disclosed in Journal of Organic Chemistry, 31, 838 (1966); and these derivatives are useful as herbicides and nematocides. Isothiocyanates also react with a molar excess of chlorine to provide the corresponding isocyanide dichlorides which are known to be useful pesticides.

A variety of synthetic methods have been previously utilized to obtain the aforementioned esters. For example, they may be generally prepared by the reaction of primary amines with thiophosgene, but this is not a practical procedure since thiophosgene is not readily available. Some of the isothiocyanates have been prepared by the reaction of isocyanate esters with phosphorus pentasulfide, but this is not a general reaction and cannot be utilized in the preparation of all isothiocyanates. The esters have also been prepared by an involved synthetic route comprising reacting primary amines with carbon disulfide in the presence of selected bases to provide salts of dithiocarbamic acids which can then be further reacted to the desired isothiocyanates, but this is a complicated and costly procedure.

It has now been found that aromatic isothiocyanates are provided in good yield and high purity by reacting a carbocyclic aromatic nitrogen compound such as an aromatic nitro compound, an aromatic nitroso compound, an aromatic azo compound, an aromatic azoxy compound, or mixtures thereof with carbon disulfide and/or carbonyl sulfide in an anhydrous system at an elevated temperature in the presence of potassium hydrosulfide. The process of this invention is a convenient, direct one-step procedure for providing aromatic isothiocyanates from cheap, readily available reactants. This process obviates the requirement of utilizing the previously disclosed tedious multi-step procedures. Addition of potassium hydrosulfide to the reaction mixture not only increases the yield of aromatic isothiocyanate but also reduces the number of byproducts, thereby greatly simplifying the recovery procedure and lowering process costs.

For convenience, the aromatic nitrogen compound reactant of this invention will be defined in terms of a carbocyclic aromatic nitro compound. Corresponding aromatic nitroso, aromatic azo and aromatic azoxy compounds can also be employed. It is to be understood that proportions of reactants, catalyst, solvent and the like based on "nitro" groups in the aromatic nitro compound also represent the same proportion ranges per mole of nitrogen-containing group if the aromatic nitro compound is replaced with an aromatic nitroso, aromatic azo or aromatic azoxy compound.

More in detail, the aromatic nitro compound reactant may be at least one of a wide variety of aromatic nitro compounds. As used herein, the term a carbocyclic "aromatic nitro compound" represents those organic compounds having at least one nitro group attached directly to an aromatic hydrocarbon nucleus such as a benzene, naphthalene, anthracene, phenanthrene and the like. The aromatic hydrocarbon nucleus may also contain other ring substituents in addition to the nitro groups. Thus the term carbocyclic "aromatic nitro compound" as used herein also represents aromatic hydrocarbons having alkyl, aryl, aralkyl, alkoxy, aryloxy, alkylmercapto, arylmercapto, halogen, cyano, isocyanato, or isothiocyanato substituents on the aromatic hydrocarbon moiety in addition to the one or more nitro groups. In general, these additional ring substituents do not inhibit completely the reaction of carbon disulfide or carbonyl sulfide with the nitro groups under the conditions of the process disclosed herein. Carbon disulfide or carbonyl sulfide may also react with some of these additional ring substituents concurrently with the reaction of the nitro groups, and some of these substituents may impede or retard the desired reaction of $CS_2$ or COS with the nitro groups as for instance by introducing a steric hindrance factor; but invariably some formation of aromatic isothiocyanate occurs by the process albeit at a reduced rate or in lower yield.

Thus among the aromatic nitro compounds which may be used as reactants in the practice of this invention are the various nitrobenzenes, nitronaphthalenes and nitroanthracenes. Also included as useful reactants are the various nitrobiphenyls, nitrotoluenes, nitroxylenes, nitromesitylenes, nitrodiphenyl alkanes, alkoxynitrobenzenes, nitrodiphenyl ethers, nitropolyphenyl ethers, alkylmercapto nitrobenzenes, nitrodiphenyl thioethers, nitrobenzonitriles, and aromatic nitrohalocarbons.

Illustrative of specific aromatic nitro compounds useful as reacants are: nitrobenzene, o-dinitrobenzene, m-dinitrobenzene, p-dinitrobenzene, 1,3,5-trinitrobenzene, 1-nitronaphthalene, 2-nitronaphthalene, o-nitrotoluene, m-nitrotoluene, p-nitrotoluene, 2,4-dinitrotoluene, 2,6-dinitrotoluene, o-nitro-p-xylene, 2-methyl-1-nitronaphthalene, dinitromesitylene, o-nitrobiphenyl, m-nitrobiphenyl, p-nitrobiphenyl, 4,4'-dinitrobiphenyl, 2,4-dinitrobiphenyl, bis(p-nitrophenyl)methane, o-nitroanisole, m-nitroanisole, p-nitroanisole, 2,4-dinitroanisole, o-nitrophenetole, p-nitrophenetole, and 2,4-dinitrophenetole.

Similarly: o-nitrophenyl phenyl ether, m-nitrophenyl phenyl ether, p-nitrophenyl phenyl ether, bis(2,4-dinitrophenyl)ether, bis(p - nitrophenyl)ether, o - nitrophenyl phenyl thioether, m-nitrophenyl phenyl thioether, p-nitrophenyl phenyl thioether, bis(p - nitrophenyl)thioether, o - nitrophenyl methyl thioether, bis(p - nitrophenoxy) ethane, 1 - chloro - 2 - nitrobenzene, 1 - bromo - 2 - nitrobenzene, 1 - chloro - 3 -nitrobenzene, 1 - bromo - 3 - nitrobenzene, 1 - chloro - 4 - nitrobenzene, 1 - bromo-4-nitrobenzene, 1 - fluoro - 4 - nitrobenzene, 2 - chloro-6-nitrotoluene, 2 - bromo - 6 - nitrotoluene, 2 - fluoro-6-nitrotoluene, 4 - chloro - 3 - nitrotoluene, 1 - chloro - 2,4-dinitrobenzene, 1 - bromo - 2,4 - dinitrobenzene, 1 - fluoro-2,4 - dinitrobenzene, 1,4 - dichloro - 2 - nitrobenzene, 1,4 - difluoro - 2 - nitrobenzene, 1,3,5 - trichloro - 2 - nitrobenzene, 1,3,5 - tribromo - 2 - nitrobenzene, 1,2 - dichloro-4 - nitrobenzene, 1,2,4 - trichloro - 5 - nitrobenzene, o-nitrophenyl isocyanate, m - nitrophenyl isocyanate, p-nitrophenyl isocyanate, 1 - chloro 2,4 - dimethoxy-5-nitrobenzene, 1,4 - dimethoxy - 2 - nitrobenzene, o - nitrobenzonitrile, m - nitrobenzonitrile, p - nitrobenzonitrile, 3,3' - dimethoxy - 4,4' - dinitrobiphenyl, and 3,3' - dimethyl - 4,4' - dinitrobiphenyl may be employed as starting reactants.

Isomers and mixtures of the aforesaid aromatic nitro compounds and substituted aromatic nitro compounds may also be utilized in the practice of this invention as well as homologues and other related compounds. Generally, the starting nitro compound reactants contain between 6 and about 20 and preferably below about 14 carbon atoms. Compounds which have both nitro and isothiocyanato substituents may also be employed as reactants. When aromatic polynitro compounds are utilized as reactants in this process, considerable amounts of compounds having both nitro and isothiocyanato groups are usually provided. Thus, for instance, when bis(p-nitrophenyl)sulfide is employed as a reactant, 4 - nitrophenyl - 4' - isothiocyanatophenyl sulfide is provided. Since the process of this invention is conveniently adaptable to batchwise, semi-continuous, or continuous operations, the nitro-isothiocyanato derivative may be utilized as a starting reactant in a new batch operation or may simply be directly converted to the bis-isothiocyanato derivative by recycling in a continuous practice of this process.

While the process is generally applicable to the conversion of any of the aforementioned aromatic nitro compounds to aromatic isothiocyanates, included among the preferred reactants to be utilized in this invention are the nitrobenzenes, both mono- and polynitro, including isomeric mixtures thereof; the alkylnitrobenzenes, including the various nitrated toluenes and the nitrated xylenes; the alkoxynitrobenzenes; the nitrated mono-, di-, and trichlorobenzenes and toluenes; nitrated biphenyl and nitrated diphenylmethane. Other preferred reactants which can be particularly mentioned include the nitrodiphenyl ethers, the bis(nitrophenoxy)alkanes, and the bis(nitrophenyl)sulfides.

Aromatic nitroso compounds, aromatic azo compounds, and aromatic azoxy compounds are also converted to aromatic isothiocyanates in accordance with this invention. As described in the preceding discussion relating to suitable aromatic nitro compound reactants, the aromatic nitroso, aromatic azo and aromatic azoxy compounds may also contain one or more other substituents on the aromatic ring in addition to the reactive nitroso, azo or azoxy groups.

In the reaction with aromatic mononitro, mononitroso, monoazo or monoazoxy reactants, it has been found that preferred practice involves utilizing at least one mole of carbon disulfide or carbonyl sulfide per mole of nitrogenous reactant. When a bifunctional reactant (e.g., a dinitro compound) is used, the amount of $CS_2$ or $COS$ is preferably doubled. Optimum yields of aromatic isothiocyanates are in fact obtained when excess molar amounts of carbon disulfide or carbonyl sulfide are employed, that is, more than an equimolar quantity in reaction with a mononitro compound for instance. The use of molar excesses is also advantageous in that the $CS_2$ and COS function as solvents in the reaction system.

The function of potassium hydrosulfide in the reaction is not clearly understood, but it appears to have some catalytic effect on the reaction. For this reason, potassium hydrosulfide is referred to throughout the description and claims as a catalyst, even though it may also be a reactant or other agent during the reaction.

As indicated previously, the number of by-products are substantially reduced when the reaction is carried out in the presence of potassium hydrosulfide. As a result, the residue after isolation of the aromatic isothiocyanate, generally predominates in the corresponding N,N'-disubstituted urea, which is easily isolated by well-known chemical techniques. Since the reaction product predominates in the isothiocyanate and the substituted urea, a significant savings in equipment and operating costs are realized by the use of potassium hydrosulfide, because of the relative simplicity in separating and recovering the reaction products.

In carrying out the process of one embodiment of this invention, the aromatic nitro compound and catalyst are placed in a suitable pressure vessel, such as an autoclave, which is equipped with a sparger for feeding gas or liquid into the bottom thereof. The pressure vessel is also optionally provided with agitation means as well as cooling and heating means. Preferably, in the case of carbonyl sulfide, after the slurry or solution of catalyst and aromatic nitro compound is placed into the pressure vessel, it is sealed, and carbonyl sulfide is pumped into the pressure vessel through the sparger until the desired amount is added. Preferably in the case of carbon disulfide, the desired amount of carbon disulfide is added as a liquid to the catalyst and aromatic nitro compound before the pressure vessel is closed. However, if desired the carbon disulfide can be added in the same manner as described above for the carbonyl sulfide, which may be liquid and/or gas when added to the reactor. For convenience, the term "sulfur compound of carbon" will be used throughout the description and claims to include either carbon disulfide, carbonyl sulfide or mixtures thereof in any ratio.

After the desired temperature and pressure conditions are obtained, the sulfur compound of carbon may be fed continuously through the sparger into the suspension of catalyst and aromatic nitro compound during the entire reaction period while maintaining the pressure at the desired level.

The order of mixing the reactants is not critical and may be varied within the limitations of the equipment employed. In one embodiment, the aromatic nitro compounds, catalyst, sulfur compound of carbon in liquid form and, if desired, solvent, are charged to a suitable pressure vessel such as an autoclave which was previously purged with nitrogen, and which is preferably provided with agitation means such as a stirrer or an external rocking mechanism. The operating pressure can be attained by heating and/or by feeding under appropriate temperature conditions the sulfur compound of carbon into the autoclave. The operating pressure after heating or after feeding the sulfur compound of carbon into the closed autoclave is in the range between about 30 and about 10,000 p.s.i.g., and preferably between about 100 and about 2000 p.s.i.g., but greater or lesser pressures may be employed if desired.

Generally the quantity of the sulfur compound of carbon in the free space of the reactor is maintained at a level sufficient to maintain the desired pressure as well as to provide reactant for the process, as the reaction progresses. If desired, additional sulfur compound of carbon can be fed to the reactor either intermittently or continuously as the reaction progresses to maintain the pressure within the above range. The total amount of the sulfur compound of carbon added is generally between about 1 and about 50, and preferably between about 2 and about 15 moles of the sulfur compound of carbon per nitro group in the aromatic nitro compound. Greater or lesser amounts may be employed if desired. The highest requirements of the sulfur compound of carbon are generally utilized in a process in which the gas is added continuously, but suitable recycle of the gas stream greatly reduces the overall consumption of the sulfur compound of carbon.

The molar proportion of catalyst to each nitro group in the aromatic nitro compound in the reaction is generally equivalent to between about 1:1000 and about 1:1, and preferably between about 1:100 and about 1:2. However, greater or lesser proportions may be employed if desired.

The reaction between the sulfur compound of carbon with the aromatic nitro compound may be effected in the absence of a solvent, but can also be performed in a solvent which is chemically inert to the components of the reaction system. Suitable solvents include aliphatic, cycloaliphatic, aromatic solvents such as n-heptane, cyclohexane, benzene, toluene, and xylene, and halogenated aliphatic and aromatic hydrocarbons such as dichloromethane, trichloroethylene, perchloroethylene, tetrachloroethane, monochlorobenzene, dichlorobenzene, and chloronaphthalene, as well as tetramethyl urea, dioxane, tetrahydrofuran, mixtures thereof and the like.

The proportion of solvent is not critical and any proportion may be employed which will not require excessively large equipment to contain. Generally the weight percent of aromatic nitro compound in the solvent is in the range between about 2.0 and about 75 percent, but greater or lesser proportions may be employed if desired.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, and on the amount of catalyst being charged, as well as the type of equipment being employed. Usually between one-half hour and 20 hours are required to obtain the desired degree of reaction in a batch operation, but shorter or longer reaction times may be employed. In a continuous process, the reaction time may be much lower, i.e., substantially instantaneous and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the aromatic isothiocyanates from the reaction product. However, other suitable separation techniques such as extraction, sublimation, etc., may be employed to separate the aromatic isothiocyanates from the unreacted aromatic nitro compound and any by-products that may be formed.

The following examples are presented to describe the invention more fully without any intention of being limited thereby. All parts and percentages are by weight unless otherwise specified.

EXAMPLE 1

A 100 ml. rocking autoclave was charged with 4.10 grams (0.033 mole) of nitrobenzene, 0.173 gram (0.0024 mole) of anhydrous potassium hydrosulfide, and 10 grams of tetramethyl urea. The autoclave was closed, and to it was charged 21.9 grams (0.365 mole) of carbonyl sulfide. The autoclave was then cooled to room temperature and the contents discharged. The mixture thus obtained was filtered, and the solid portion washed with ether. Evaporation of the ether left 11.07 grams of filtrate, which was shown by vapor phase chromatography to contain 1.28 grams nitrobenzene (69 percent conversion) and 1.18 grams phenylisothiocyanate (38 percent corrected yield).

EXAMPLE 2

A 100 ml. autoclave was charged, as in Example 1, with 4.10 grams of nitrobenzene, 0.16 gram of anhydrous KSH and 29.7 grams of COS, and the mixture was heated at 150° C. for 3 hours. The discharged materials was extracted with pentane and a pentane soluble oil (4.0 grams) recovered by evaporation of solvent. Analysis of this oil by vapor phase chromatography showed that it contained 2.9 grams nitrobenzene (29 percent conversion) and 0.84 gram phenylisothiocyanate (66 percent corrected yield).

EXAMPLE 3

A 100 ml. autoclave was charged, as in Example 1, with 4.10 grams of nitrobenzene, 0.16 gram of anhydrous KSH, and 13.7 grams of COS. The autoclave was then pressurized with 2600 p.s.i.g. of carbon monoxide, after which it was heated at 150° C. for 3 hours. The resulting product was extracted with ether, and the ether soluble oil (3.0 grams) was shown by analysis of vapor phase chromatography to contain 0.1 gram nitrobenzene (97 percent conversion) and 2.2 grams phenylisothiocyanate (51 percent corrected yield).

EXAMPLE 4

A 100 ml. rocking autoclave, charged with 4.10 grams of nitrobenzene, 0.48 gram of KSH, and 20 grams of carbon disulfide, was heated at 150° C. for 3 hours. The resulting product was filtered, and the excess $CS_2$ evaporated from the filtrate. Analysis of the residual oil by vapor phase chromatography showed it to contain 3.14 grams of nitrobenzene (23 percent conversion) and 0.57 gram of phenylisothiocyanate (68 percent corrected yield).

Various modifications of the invention some of which have been referred to above may be employed without departing from the spirit of the invention.

What is desired to be secured by Letters Patent is:

1. The process for preparing aromatic isothiocyanates which comprises reacting:
    (a) a sulfur-containing compound of carbon selected from the group consisting of:
        (1) carbon disulfide,
        (2) carbonyl sulfide, and
        (3) mixtures of carbon disulfide and carbonyl sulfide, and
    (b) a carbocyclic aromatic nitro compound containing between 6 and about 20 carbon atoms in the presence of
    (c) anhydrous potassium hydrosulfide as a catalyst at a temperature between about 25° C. and about 250° C. and a pressure between about 30 and about 2000 p.s.i.g., and recovering the aromatic isothiocyanate produced thereby.

2. The process of claim 1 wherein the molar proportion of potassium hydrosulfide per mole of nitro groups in said aromatic nitro compound is in the range between about 1:0.3 and about 1:1000.

3. The process of claim 2 wherein the molar proportion of sulfur-containing compound of carbon per mole of nitro groups in said aromatic nitro compound is in the range between about 1:1 and about 50:1.

4. The process of claim 3 wherein the molar proportion of potassium hydrosulfide to each nitro group in said aromatic nitro compound is in the range of between about 1:0.6 and about 1:100.

5. The process of claim 4 wherein said aromatic nitro compound is selected from the group consisting of nitrobenzene, meta-chloronitrobenzene, nitrotoluene and dinitrotoluene.

6. The process of claim 5 wherein said sulfur compound of carbon is carbonyl sulfide, and the molar proportion of carbonyl sulfide to said aromatic nitro compound is in the range of between about 2:1 and about 15:1.

7. The process of claim 6 wherein said aromatic nitro compound is nitrobenzene.

8. The process of claim 6 wherein said aromatic nitro compound is dinitrotoluene.

9. The process of claim 6 wherein said aromatic nitro compound is nitrotoluene.

10. The process of claim 5 wherein said sulfur compound of carbon is carbon disulfide and the molar proportion of carbon disulfide to said aromatic nitro compound is in the range between about 2:1 and about 15:1.

11. The process of claim 10 wherein said aromatic nitro compound is nitrobenzene.

12. The process of claim 10 wherein said aromatic nitro compound is nitrotoluene.

13. The process of claim 10 wherein said aromatic nitro compound is dinitrotoluene.

References Cited

UNITED STATES PATENTS

| | | | |
|---|---|---|---|
| 1,689,014 | 10/1928 | Dieterle | 260—689 XR |
| 2,631,167 | 3/1953 | Werner | 260—689 XR |
| 2,263,386 | 11/1941 | Hester | 260—454 |
| 3,235,580 | 2/1966 | Kühle | 260—454 |
| 3,255,252 | 6/1966 | Gold | 260—689 XR |

LEWIS GOTTS, Primary Examiner

G. HOLLRAH, Assistant Examiner

U.S. Cl. X.R.

71—104; 424—302